(12) United States Patent
Arena

(10) Patent No.: US 9,986,073 B2
(45) Date of Patent: May 29, 2018

(54) STANDOFF ASSISTANT SYSTEMS FOR PORTABLE COMMUNICATION DEVICES

(71) Applicant: Xander Arena, Phoenix, AZ (US)

(72) Inventor: Xander Arena, Phoenix, AZ (US)

( * ) Notice: Subject to any disclaimer, the term of this patent is extended or adjusted under 35 U.S.C. 154(b) by 0 days. days.

(21) Appl. No.: 13/726,175

(22) Filed: Dec. 23, 2012

(65) Prior Publication Data

US 2013/0161480 A1 Jun. 27, 2013

Related U.S. Application Data

(60) Provisional application No. 61/579,675, filed on Dec. 23, 2011.

(51) Int. Cl.
*G06F 1/16* (2006.01)
*H04M 1/02* (2006.01)

(52) U.S. Cl.
CPC ......... *H04M 1/0206* (2013.01); *G06F 1/1622* (2013.01); *G06F 1/1626* (2013.01); *H04M 1/0216* (2013.01); *H04M 1/0227* (2013.01); *H04M 2250/12* (2013.01)

(58) Field of Classification Search
USPC ............... 248/447, 454, 457, 458, 460, 463; 361/679.01, 679.3
See application file for complete search history.

(56) References Cited

U.S. PATENT DOCUMENTS

| 4,856,748 | A | * | 8/1989 | Obermeyer | 248/688 |
| 6,880,796 | B2 | * | 4/2005 | Khor | F16C 11/10 16/334 |
| 7,590,435 | B2 | | 9/2009 | Park et al. | |
| 7,681,859 | B2 | * | 3/2010 | Kim | 248/688 |
| 8,162,283 | B1 | * | 4/2012 | Royz et al. | 248/455 |
| 8,243,432 | B2 | * | 8/2012 | Duan et al. | 361/679.3 |
| 8,297,440 | B2 | * | 10/2012 | Schmidt et al. | 206/320 |
| 8,382,059 | B2 | * | 2/2013 | Le Gette et al. | 248/460 |
| 8,523,124 | B2 | * | 9/2013 | Yuan et al. | 248/188.8 |
| 8,587,933 | B2 | * | 11/2013 | Ho et al. | 361/679.01 |
| 8,767,395 | B2 | * | 7/2014 | Yoo | 361/679.56 |
| 8,922,996 | B2 | * | 12/2014 | Yeh et al. | 361/679.59 |
| 2003/0213886 | A1 | * | 11/2003 | Gilbert | 248/454 |
| 2003/0232597 | A1 | | 12/2003 | Mayer | |
| 2007/0012856 | A1 | * | 1/2007 | Chan et al. | 248/677 |
| 2010/0142130 | A1 | * | 6/2010 | Wang et al. | 361/679.01 |
| 2014/0085777 | A1 | * | 3/2014 | Yeh et al. | 361/679.01 |

* cited by examiner

*Primary Examiner* — Alfred Wujciak
(74) *Attorney, Agent, or Firm* — Keith L. Jenkins, Registered Patent Attorney, LLC; Keith L. Jenkins

(57) ABSTRACT

A standoff device for assisting in maintaining a handheld portable communications device a predetermined distance away from a user's head. Some embodiments use one or more rigid members stowable on the communication device and deployable there from to contact the user's head to establish and indicate a predetermined spaced-apart distance. Some embodiments incorporate panels of resilient materials or fabric for communications privacy. Some embodiments use an electronic range finder on the communications device to alarm when the device is held too close to the head. The standoff device may be attached to or built into the housing of the communications device or may be attached to or built into a case for the communications device.

11 Claims, 8 Drawing Sheets

STANDOFF ASSISTANT SYSTEMS FOR PORTABLE COMMUNICATION DEVICES

RELATED APPLICATIONS

This application claims the benefit of U.S. provisional patent application Ser. No. 61/579,675 filed Dec. 23, 2011 naming the same inventor.

FIELD OF THE INVENTION

This invention relates to standoff assistant systems for portable communications devices. The invention further relates to mechanical portable communications device standoff assistant systems and electronic portable communications device standoff assistant systems.

BACKGROUND

Concerns have arisen about the affects of electromagnetic radiation from portable communications devices, such as cellular telephones, PDAs, and the like, on human brain tissue. While the debate continues, consumer concern remains high. Studies have shown that maintaining the portable communications device several centimeters or more away from the human head ameliorates the potential harm by minimizing the interaction of the reflective near field with biologic tissue and consequently lowering the specific absorption rate (SAR). However, it is difficult for a portable communications device user to judge the distance between the portable communications device and the user's head.

Therefore, a need exists for standoff assistant systems that can assist a portable communications device user in maintaining the portable communications device a safe distance from the user's head. A need also exists for a standoff assistant that can be added to existing portable communications devices. A need exists for a standoff assistant that can be built into a housing, cover, or case for a portable communications device. A need exists for a standoff assistant that is easily deployed. A need exists for a standoff assistant that works electronically. A need exists for a standoff assistant that works electronically and/or mechanically.

OBJECTS AND FEATURES OF THE INVENTION

A primary object and feature of the present invention is to overcome the above-mentioned problems and fulfill the above-mentioned needs.

Another object and feature of the present invention is to provide standoff assistant systems that can assist a portable communications device user in maintaining the portable communications device a safe distance from the user's head. Another object and feature of the present invention is to provide a standoff assistant that can be added to existing portable communications devices. Another object and feature of the present invention is to provide a standoff assistant that can be built into a housing, cover, or case for a portable communications device. Another object and feature of the present invention is to provide a standoff assistant that is easily deployed. Another object and feature of the present invention is to provide a standoff assistant that works electronically. Another object and feature of the present invention is to provide a standoff assistant that works electronically and/or mechanically.

It is an additional primary object and feature of the present invention to provide standoff assistant systems that are safe, inexpensive, easy to clean, and handy. Other objects and features of this invention will become apparent with reference to the following descriptions.

SUMMARY OF THE INVENTION

In accordance with a preferred embodiment hereof, the present invention provides a standoff assistant system for portable communications device users having a deployable mechanical device that assists the user in keeping the portable communications device a safe distance from the user's head. In accordance with another preferred embodiment hereof, the present invention provides a standoff assistant system for portable communications device users having an electronic range-finder with an audible, visual, and/or tactile alarm that assists the user in keeping the portable communications device a safe distance from the user's head. In various preferred embodiments, the standoff assistant may be built into original equipment housings for portable communications device electronics, built into a cover or case for after-market attachment to the portable communications device, or may have independent attachment means to existing portable communications devices.

A standoff assistant for a handheld portable communications device, including: a standoff, including a rigid member able to be deployed into a spaced-apart relationship with the portable communications device; and a coupling from the portable communications device to the rigid member; where the standoff is able, when deployed, to assist in maintaining the portable communications device a predetermined distance from a user's head when the portable communications device is in use. The standoff assistant, where the standoff has a stowed position adjacent the portable communications device. The standoff assistant, where the standoff is shaped conformally to a portion of the portable communications device. The standoff assistant, where the coupling is attached to either housing or a case for containing the portable communications device. The standoff assistant, where the portable communications device includes a access opening and the standoff includes a opening aligned, when stowed, to the access opening. The standoff assistant, where the coupling includes a pivotable coupling. The standoff assistant, where the standoff includes first and second standoffs stowable on opposing sides of the portable communications device and deployable there from. The standoff assistant, where the standoff includes a single rigid member and the coupling includes a single pivotable coupling, and where the single member is stowed on and deployable from an end of the portable communications device proximate an audio speaker of the portable communications device. The standoff assistant, where the coupling includes a frame in which the standoff includes a side of the frame. The standoff assistant, where the frame further includes a leg, extending from the portable communications device to the frame, that is either deployed from inside the portable communications device or folded up from a surface of the portable communications device. The standoff assistant, where the standoff assistant supports, when deployed, a fabric enclosure. The standoff assistant, where the standoff assistant includes: a plurality of joined resilient standoff panels having first and second continuous opposed edges; and a coupling to the portable communications device along the first edge. The standoff assistant, where the standoff assistant includes: fold lines on and between the resilient panels, the fold lines including thin resilient material; the coupling includes a flexible coupling to the portable communications device along the first edge; and where the standoff assistant is able to be collapsed by folding along the fold lines and to be deployed by pulling outward on the second edge.

A standoff assistant for a portable communications device, including: a standoff, including a device able to indicate a spaced apart relationship with the portable communications device; and an operational relationship between the portable communications device and the standoff; where the standoff is able, when deployed, to assist in maintaining the portable communications device a predetermined distance from a user's head when the portable communications device is in use. The standoff assistant, where the standoff includes a rigid member deployable to establish and indicate a predetermined distance between the portable communications device and a head of a user. The standoff assistant, where the operational relationship includes a flexible coupling between the rigid member and either a housing or a case for the portable communications device. The standoff assistant, where the rigid member either supports or includes a panel of either resilient material or fabric. The standoff assistant, where the rigid member includes an opening. The standoff assistant, where: the standoff includes an electronic range finder attached to the portable communications device and able to determine a range between the portable communications device and a head of a user; and the operational relationship includes an alarm responsive to the determined range to indicate to the user if the determined range is less than a predetermined value.

A standoff assistant for a portable communications device, including: a standoff, including a device able to indicate a spaced apart relationship with the portable communications device; an operational relationship between the portable communications device and the standoff; where the standoff is able, when deployed, to assist in maintaining the portable communications device a predetermined distance from a user's head when the portable communications device is in use; where the standoff includes either: a rigid member deployable to establish and indicate a predetermined distance between the portable communications device and a head of a user; or an electronic range finder attached to the portable communications device and able to determine and indicate a range between the portable communications device and a head of a user.

BRIEF DESCRIPTION OF THE DRAWINGS

The above and other objects and advantages of the present invention will become more apparent from the following description taken in conjunction with the following drawings in which.

DETAILED DESCRIPTION OF THE BEST MODES AND PREFERRED EMBODIMENTS OF THE INVENTION

Figure 1A:
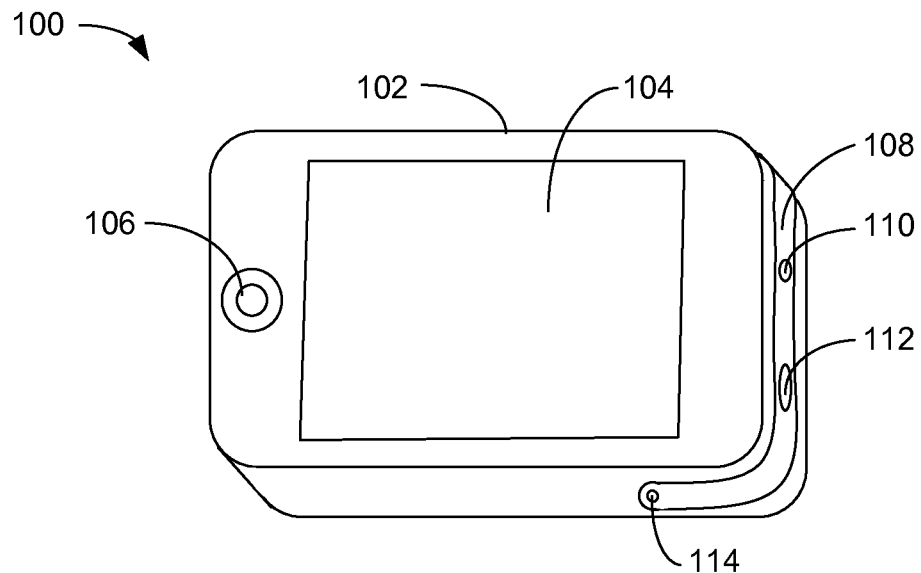
FIG. 1A is a perspective view diagram illustrating an exemplary standoff assistant for portable communications devices in a stowed configuration, according to a preferred embodiment of the present invention.

FIG. 1A is a perspective view diagram illustrating an exemplary standoff assistant 108 for portable communications devices 100 in a stowed configuration, according to a preferred embodiment of the present invention. Portable communications device 100 outer housing 102 supports a screen 104 and phone control feature 106, as well as standoff assistant 108. Standoff assistant 108 is a rigid strip in a slightly squared-off "C" shape that conforms to the end of the housing 102 and connects to the housing 102 by pivots 114 (one visible in this view) proximate each end of the standoff assistant 108. Standoff assistant has openings 110 and 112 to accommodate access to portable communications device 100 access openings 116 and 118 (See FIG. 1B) in housing 102. In some alternate embodiments, housing 102 may be a rigid or semi-rigid case or cover for a portable communications device 100. In an alternate embodiment, pivots 114 may be attached to housing 102 with adhesive or other attachment means. Standoff assistant 108 may be packaged and sold with the attachment means, or as part of a case or cover for portable communications devices 100, or built into the housing 102 of the portable communications device 100. The illustrated shape of standoff assistant 108 is not a limitation of the invention.

Figure 1B:
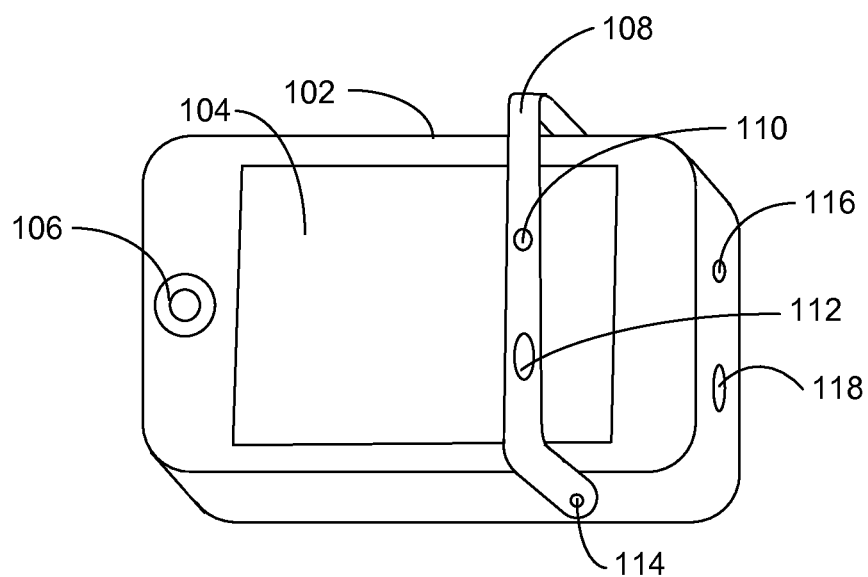
FIG. 1B is a perspective view diagram illustrating an exemplary standoff assistant for portable communications devices in a deployed configuration, according to the preferred embodiment of FIG. 1A.

FIG. 1B is a perspective view diagram illustrating an exemplary standoff assistant 108 for portable communications devices 100 in a deployed configuration, according to the preferred embodiment of FIG. 1A. Ends of standoff assistant 108 are preferably fitted with détentes so that the standoff assistant has two stable states: stowed and deployed, as shown. In the deployed configuration, the user may rest the standoff assistant 108 against the side of his head 606 (see FIG. 6) to assist in maintaining the portable communications device 100 a safe distance from the user's head 606.

Figure 2A:
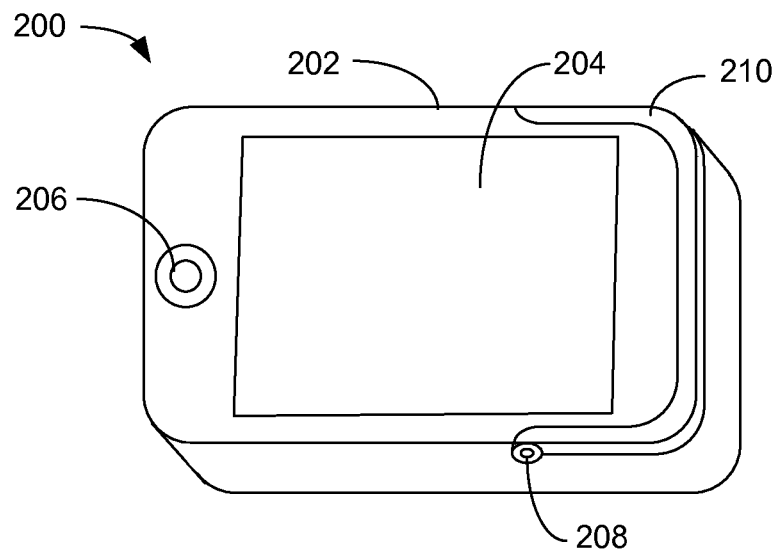
FIG. 2A is a perspective view diagram illustrating an exemplary standoff assistant for portable communications devices in a stowed configuration, according to another preferred embodiment of the present invention.

FIG. 2A is a perspective view diagram illustrating an exemplary standoff assistant 210 for portable communications devices 200 in a stowed configuration, according to another preferred embodiment of the present invention. Portable communications device 200 outer housing 202 supports a screen 204 and phone control feature 206, as well as standoff assistant 210. Standoff assistant 210 is a rigid beam in a slightly squared-off "C" shape that conforms to the curvature of the housing 202 and connects to the housing 202 by pivots 208 (one visible in this view) proximate each end of the standoff assistant 210. In some alternate embodiments, housing 202 may be a rigid or semi-rigid case or cover for a portable communications device 200. Standoff assistant 210 may be packaged and sold as part of a case or cover for portable communications devices 200, or built into the housing 202 of the portable communications device 200. The illustrated shape of standoff assistant 210 is not a limitation of the invention.

Figure 2B:
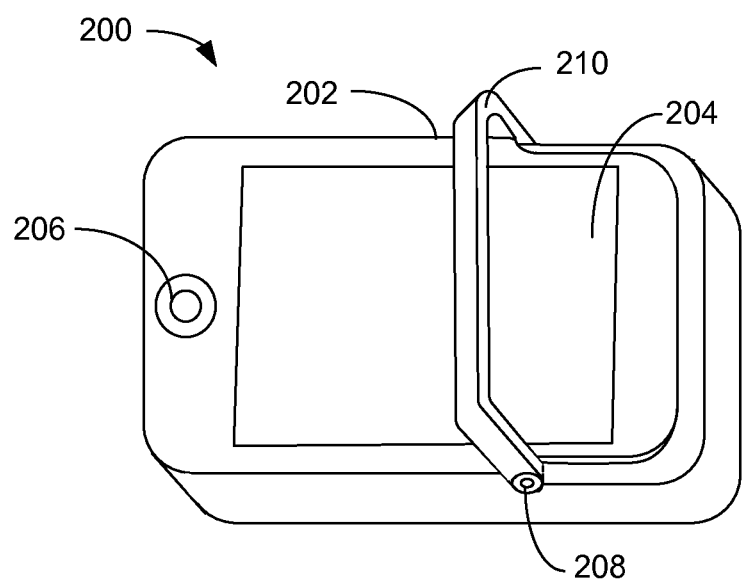
FIG. 2B is a perspective view diagram illustrating an exemplary standoff assistant for portable communications devices in a deployed configuration, according to the preferred embodiment of FIG. 2A.

FIG. 2B is a perspective view diagram illustrating an exemplary standoff assistant 210 for portable communications devices 200 in a deployed configuration, according to the preferred embodiment of FIG. 2A. Ends of standoff assistant 210 are preferably fitted with détentes so that the standoff assistant 210 has two stable states: stowed and deployed, as shown. In the deployed configuration, the user may rest the standoff assistant 210 against the side of his head 606 (see FIG. 6) to assist in maintaining the portable communications device 200 a safe distance from the user's head 606.

Figure 3A:
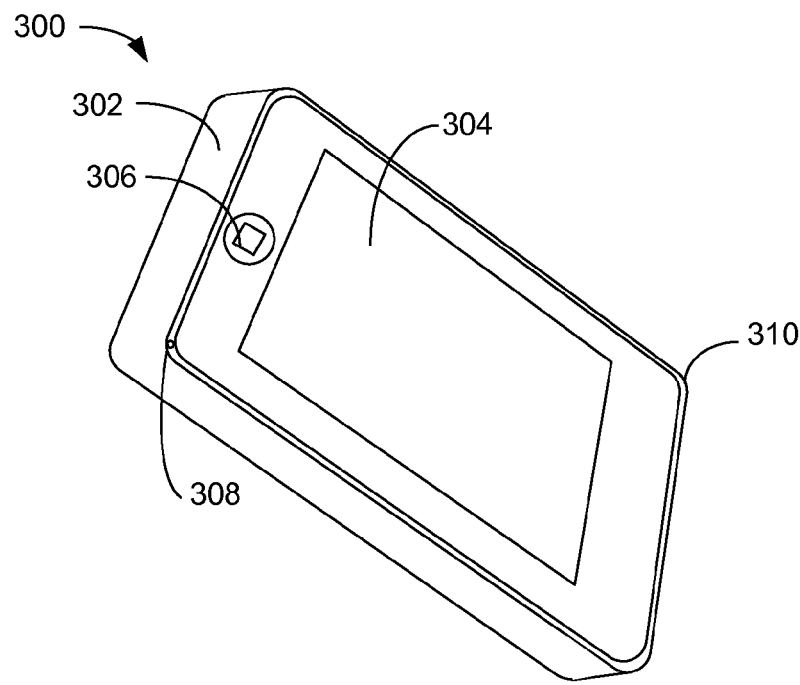
FIG. 3A is a perspective view diagram illustrating an exemplary standoff assistant for portable communications devices in a stowed configuration, according to yet another preferred embodiment of the present invention.

FIG. 3A is a perspective view diagram illustrating an exemplary standoff assistant 310 for portable communications devices 300 in a stowed configuration, according to yet another preferred embodiment of the present invention. Portable communications device 300 outer housing 302 supports a screen 304 and phone control feature 306, as well as standoff assistant 310. Standoff assistant 310 is a rigid frame in a shape that conforms to the perimeter of the housing 302 and connects to the housing 302 by flexible coupling 308 proximate one end of the standoff assistant 310. Standoff assistant 310 provides no interference with a user's viewing of the screen 304 or phone control feature 306 operation. In some alternate embodiments, housing 302 may be a rigid or semi-rigid case or cover for a portable communications device 300. In an alternate embodiment, flexible coupling 308 may be attached to housing 302 with adhesive or other attachment means. Standoff assistant 310 may be packaged and sold with the attachment means, or as part of a case or cover for portable communications devices 300, or built into the housing 302 of the portable communications device 300.

Figure 3B:
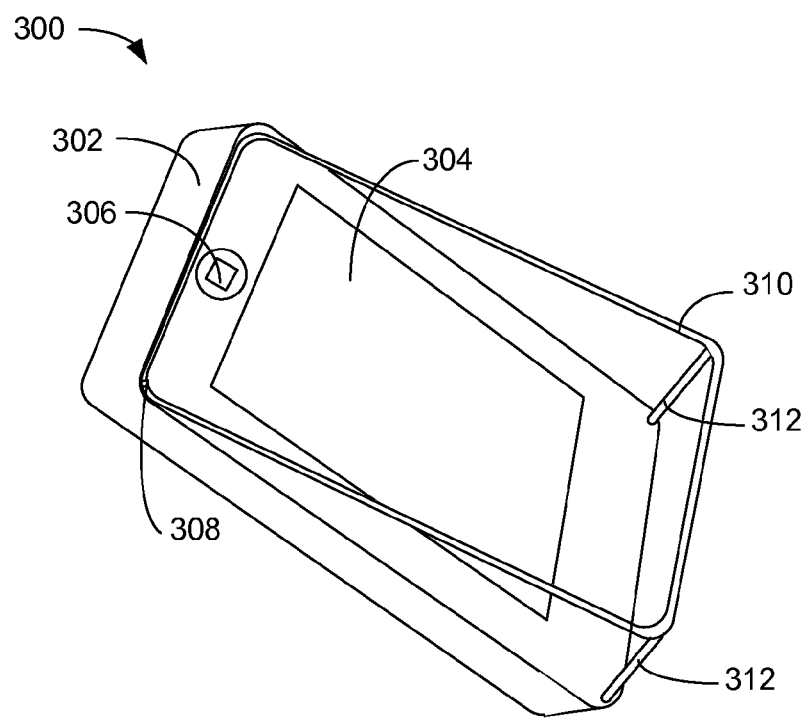
FIG. 3B is a perspective view diagram illustrating an exemplary standoff assistant for portable communications devices in a deployed configuration, according to the preferred embodiment of FIG. 3A.

FIG. 3B is a perspective view diagram illustrating an exemplary standoff assistant 310 for portable communications devices 300 in a deployed configuration, according to the preferred embodiment of FIG. 3A. In the deployed configuration, supports 312 maintain one end of the standoff assistant 310 in a spaced-apart relationship to the housing 302. Supports 312 may be drawn from cavities in housing 302 or may be unfolded from underneath standoff assistant 310. In the deployed configuration, the user may rest the standoff assistant 310 against the side of his head 606 (see FIG. 6) to assist in maintaining the portable communications device 300 a safe distance from the user's head 606. In an alternate embodiment, standoff assistant 310 may include a deployable fabric auditory enclosure supported between the standoff assistant 310 and the housing 302. The illustrated shape of standoff assistant 310 is not a limitation of the invention. In an un-illustrated embodiment, the entire frame 310 may be deployed into a spaced-apart relationship with the communications device 300 using, for example, a scissor-type coupling on two opposing sides.

Figure 4A:
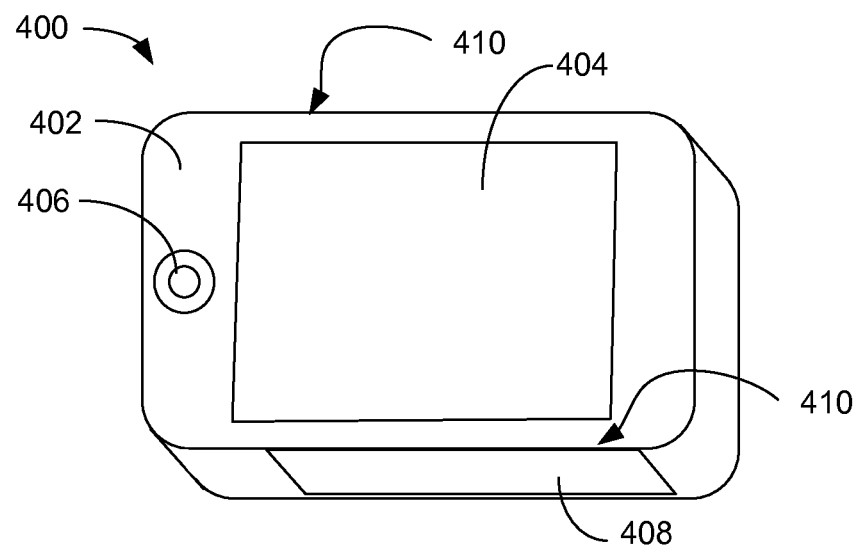
FIG. 4A is a perspective view diagram illustrating an exemplary standoff assistant for portable communications devices in a stowed configuration, according to still yet another preferred embodiment of the present invention.

FIG. 4A is a perspective view diagram illustrating an exemplary standoff assistant 408 for portable communications devices 400 in a stowed configuration, according to still yet another preferred embodiment of the present invention. Portable communications device 400 outer housing 402 supports a screen 404 and phone control feature 406, as well as standoff assistant 408. Standoff assistant 408 is a pair (one visible in this view) of rigid panels arranged along the sides of the housing 402 and connected to the housing 402 by flexible coupling 410 proximate the top edges of the sides of the standoff assistant 408. Standoff assistant 408 provides no interference with a user's viewing of the screen 404 or phone control feature 406 operations. In some alternate embodiments, housing 402 may be a rigid or semi-rigid case or cover for a portable communications device 400. In an alternate embodiment, flexible coupling 410 may be attached to housing 402 with adhesive or other attachment means. Standoff assistant 408 may be packaged and sold with the attachment means, or as part of a case or cover for portable communications devices 400, or built into the housing 402 of the portable communications device 400.

Figure 4B:
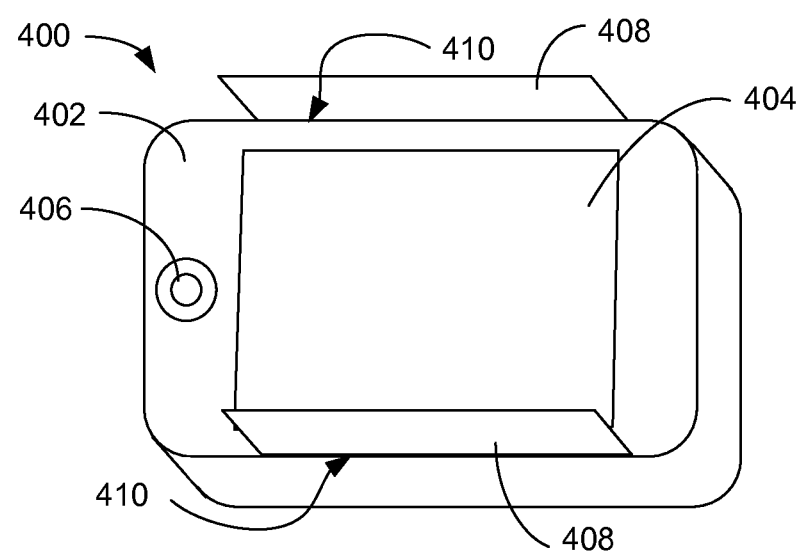
FIG. 4B is a perspective view diagram illustrating an exemplary standoff assistant for portable communications devices in a deployed configuration, according to the preferred embodiment of FIG. 4A.

FIG. 4B is a perspective view diagram illustrating an exemplary standoff assistant 408 for portable communications devices 400 in a deployed configuration, according to the preferred embodiment of FIG. 4A. Each panel of the standoff assistant 408 may, in a particular embodiment, be deployed independently. In a preferred embodiment, both panels of the standoff assistant 408 deploy concurrently. In the deployed configuration, the user may rest the standoff assistant 408 against the side of his head 606 (see FIG. 6) to assist in maintaining the portable communications device 400 a safe distance from the user's head 606. The edges of the panels of the standoff assistant 408 are preferably smoothed and rounded for the comfort of the user. The illustrated shape of standoff assistant 408 is not a limitation of the invention.

Figure 5A:
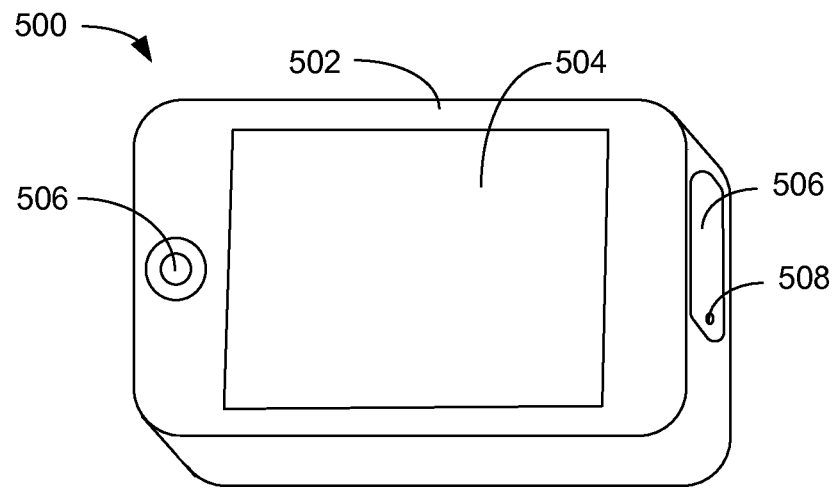
FIG. 5A is a perspective view diagram illustrating an exemplary standoff assistant for portable communications devices in a stowed configuration, according to a fifth preferred embodiment of the present invention.

FIG. 5A is a perspective view diagram illustrating an exemplary standoff assistant 506 for portable communications devices 500 in a stowed configuration, according to a fifth preferred embodiment of the present invention. Portable communications device 500 outer housing 502 supports a screen 504 and phone control feature 506, as well as standoff assistant 506. Standoff assistant 506 is a rigid member stowable along a side of the housing 502 and connected to the housing 502 by pivot 508. Standoff assistant 506 is deployable from the stowed position. Standoff assistant 506 provides no interference with a user's viewing of the screen 504 or phone control feature 506 operations. In some alternate embodiments, housing 502 may be a rigid or semi-rigid case or cover for a portable communications device 500. In an alternate embodiment, pivot 508 may be attached to housing 502 with adhesive or other attachment means. Standoff assistant 506 may be packaged and sold with the attachment means, or as part of a case or cover for portable communications devices 500, or built into the housing 502 of the portable communications device 500. The illustrated shape of standoff assistant 506 is not a limitation of the invention.

Figure 5B:
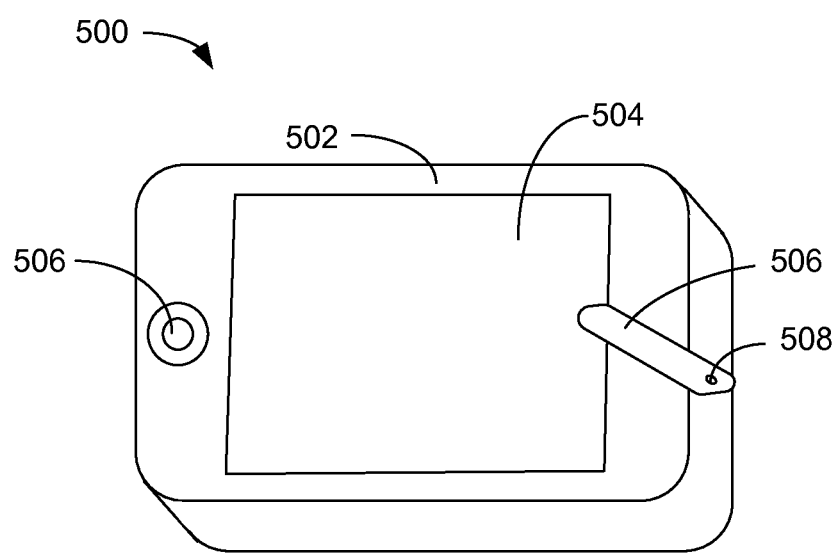
FIG. 5B is a perspective view diagram illustrating an exemplary standoff assistant for portable communications devices in a deployed configuration, according to the preferred embodiment of FIG. 5A.

FIG. 5B is a perspective view diagram illustrating an exemplary standoff assistant 506 for portable communications devices 500 in a deployed configuration, according to the preferred embodiment of FIG. 5A. In the deployed configuration, the user may rest one end of standoff assistant 506 against the side of his head 606 (see FIG. 6) to assist in maintaining the portable communications device 500 a safe distance from the user's head 606. The edges of the standoff assistant 506 are preferably smoothed and rounded for the comfort of the user. The pivotal end of standoff assistant 506 is preferably fitted with a détente so that the standoff assistant 506 has two stable states: stowed and deployed, as shown. In an additional exemplary embodiment, a plurality of standoff assistants 506 may be used for one portable communications device 500.

Figure 6:
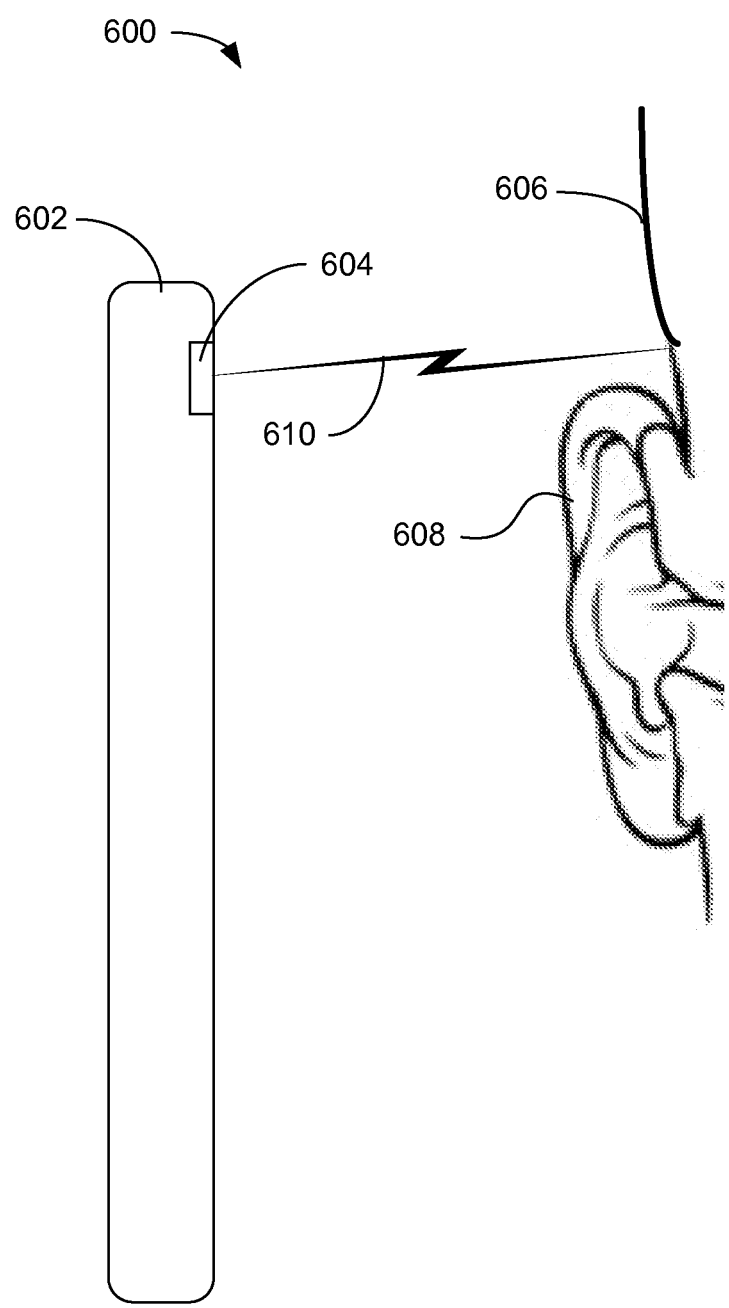
FIG. 6 is a diagram illustrating an exemplary standoff assistant for portable communications devices, according to a sixth preferred embodiment of the present invention.

FIG. 6 is a diagram illustrating an exemplary standoff assistant 604 for portable communications devices 600, according to a sixth preferred embodiment of the present invention. Portable communications device housing or case 602 supports a standoff assistant 604 that includes a range-finding, or similar proximity device, that determines a range to the user's head 606 and activates an alarm if the range is below a pre-determined threshold, such as three centimeters. The range-finding device of the standoff assistant 604 may send and receive a low-power, harmless electromagnetic signal 610 to bounce off the user's head 606 or ear 608 to determine range to the user's head 606. For example, range-finders used in modern digital phone camera control features may be used for the purpose, but preferably at lower power. The standoff assistant 604, including range-finder, power supply (i.e. battery), and alarm, is preferably a discreet component that can be attached to existing portable communications devices 600. In another preferred embodiment, the range-finder is built into a portable communications device 600 housing or case 602 and may use power from the portable communications device 600 electronics. The alarm may be audible (using the portable communications device speaker), visual (using the portable communications device phone control feature flash), and/or tactile (using vibration mode). The housing 602 may be the original housing 602 of the portable communications device electronics, or a case 602 or cover 602 for the portable communications device 600. In a particular embodiment, the electromagnetic signal 610 may be an infrared signal. In an additional embodiment, a sonic signal, above the frequency of human hearing, may be used in place of electromagnetic signal 610.

Figure 7:
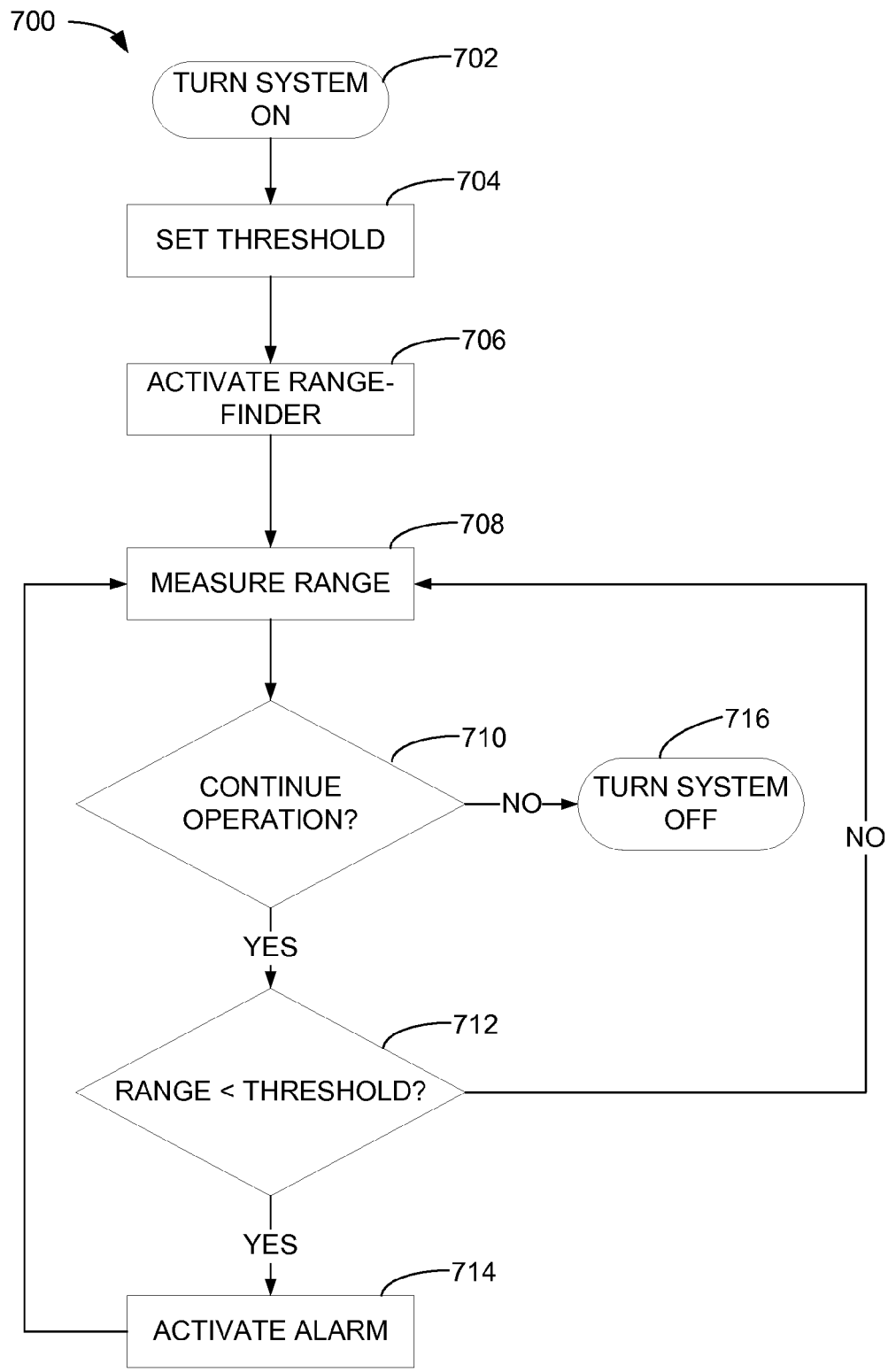
FIG. 7 is a process diagram illustrating the exemplary standoff assistant for portable communications devices, according to a preferred embodiment of the present invention.

FIG. 7 is a process diagram illustrating the exemplary process 700 for a standoff assistant 604 for portable communications devices 600, according to a preferred embodiment of the present invention. In step 702, the electronic standoff assistant is turned on, either manually or by a portable communications device 600 activation signal. The user may set a range threshold in optional step 704. The range-finder portion of the standoff assistant is activated in step 706 and begins taking range measurements, preferably at least five times per second in step 708. A decision is made whether to continue operation in step 710. The decision in step 710 may, for non-limiting examples, be based on the portable communications device 600 being turned off, the call lost, or a manual switch input. If the decision 710 is negative, then the standoff assistant is turned off in step 716.

If the decision 710 is positive, then the measured range is compared to the threshold in step 712 to see if the range is less than the threshold. If the decision 712 is negative, then the portable communications device 600 is a safe distance from the user's head and the process continues with the next measurement in step 708. If the decision is positive, then the portable communications device 600 is not a safe distance from the user's head and an alarm is activated in step 714. As previously mentioned, the alarm may be audible, visible, tactile, or any combination thereof. The duration of the alarm is not necessarily equal to the time between measurements 708. The range used in decision 712 may be determined from a sequence of measurements to reduce the false alarm rate.

Figure 8:
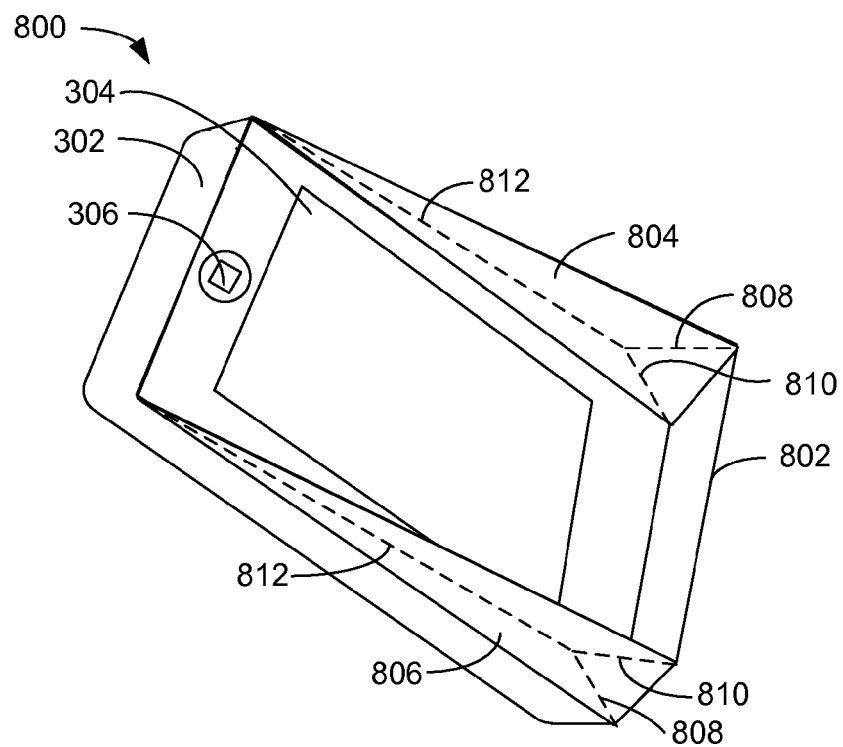
FIG. 8 is a diagram illustrating an exemplary standoff assistant for portable communications devices, according to a seventh preferred embodiment of the present invention.

FIG. 8 is a diagram illustrating an exemplary standoff assistant 800 for portable communications devices 300, according to a seventh preferred embodiment of the present invention. Standoff assistant 800 is made of a semi-rigid or resilient material such as a plastic having first and second triangular sides 804 and 806 connected by a rectangular base 802. Base 802 is located proximate the audio speaker of the cell phone 300. Each triangular side has fold lines 808, 810, and 812, as shown, and may include thin portions of the material along the fold lines 808, 810, and 812 to assist with folding. By pressing inward at the intersection of fold lines 808, 810, and 812, the standoff assistant may be collapsed for carrying in a pocket or case. By pulling the rectangular base 802 outward from the collapsed position, the first and second sides 804 and 806 are deployed to the operational position, as shown. Standoff assistant 800 may be attached directly to the outer housing 302 or may be an extension of a case or cover for communications device 300. In a particular embodiment, the semi-rigid, or resilient, panel material may be selected for its sound-deadening qualities.

Figure 9:
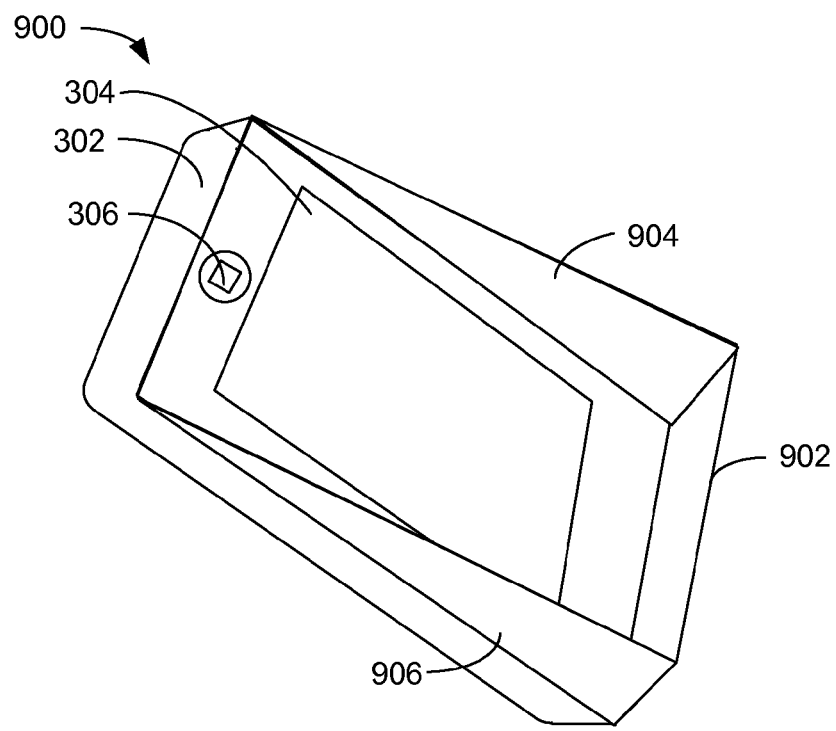
FIG. 9 is a diagram illustrating an exemplary standoff assistant for portable communications devices, according to an eighth preferred embodiment of the present invention.

FIG. 9 is a diagram illustrating an exemplary standoff assistant 900 for portable communications devices, according to a eighth preferred embodiment of the present invention. Standoff assistant 900 is similar to standoff assistant 800 but without the collapsibility function and with rigid triangular sides 904 and 906 and rigid rectangular base 902. Variation in shape of the sides 904 and 906, as well as the base 902 are permitted within the limitation of performing the function of standing the cell phone off from the user's ear by a distance equal to the safe distance determined by the manufacturer or other competent authority. The material for the standoff assistant may be a composite and may be made of, or include, sound-deadening materials, to reduce intrusive environmental sounds and for communications privacy.

I claim:

1. A standoff assistant for a handheld portable communications device, comprising:
   a. at least one standoff, comprising at least one rigid member operable to be deployed into an orientation spaced-apart from a front surface of said handheld portable communications device;
      i. wherein said at least one standoff is configured, when deployed, to assist in maintaining said handheld portable communications device a predetermined distance from a user's head when said handheld portable communications device is in use;
      ii. wherein said standoff has a stowed position adjacent said handheld portable communications device; and
      iii. wherein said front surface is located on the same side of said handheld portable communication device as a display screen of said handheld portable communication device;

b. at least one coupling from said handheld portable communications device to said at least one rigid member;

c. at least one access opening in a housing of said handheld portable communications device, configured to provide access through said housing, and wherein said at least one standoff comprises at least one opening aligned, when stowed, to said at least one access opening; and d. wherein the rigid member is in a slightly squared-off "C" shape that conforms to the end of the housing.

2. The standoff assistant of claim 1, wherein said at least one standoff is shaped conformally to at least one portion of said handheld portable communications device.

3. The standoff assistant of claim 1, wherein said at least one coupling is attached to one of a housing and a case for containing said handheld portable communications device.

4. The standoff assistant of claim 1, wherein said at least one coupling comprises at least one pivotable coupling.

5. The standoff assistant of claim 1, wherein said at least one standoff comprises first and second standoffs stowable on opposing sides of said portable communications device and deployable there from.

6. The standoff assistant of claim 1, wherein said at least one standoff comprises a single rigid member and said at least one coupling comprises a single pivotable coupling, and wherein said single member is stowed on and deployable from an end of said portable communications device proximate an audio speaker of said portable communications device.

7. The standoff assistant of claim 1, wherein said at least one coupling comprises a frame in which said at least one standoff comprises at least one side of said frame.

8. The standoff assistant of claim 7, wherein said frame further comprises at least one leg, extending from said portable communications device to said frame, that is one of deployed from inside said portable communications device and folded up from a surface of said portable communications device.

9. The standoff assistant of claim 7, wherein said at least one standoff assistant supports, when deployed, a fabric enclosure.

10. The standoff assistant of claim 1, wherein said standoff assistant comprises:

a. a plurality of joined resilient standoff panels having first and second continuous opposed edges; and b. at least one coupling to said portable communications device along said first edge.

11. The standoff assistant of claim 10, wherein said standoff assistant comprises:

a. fold lines on and between said resilient panels, said fold lines comprising thin resilient material;

b. said at least one coupling comprises at least one flexible coupling to said portable communications device along said first edge; and c. wherein said standoff assistant is operable to be collapsed by folding along said fold lines and to be deployed by pulling outward on said second edge.

\* \* \* \* \*